Nov. 3, 1959  G. A. PAULSEN  2,910,796
ROLLER FOR DRAGGER NETS
Filed March 13, 1957

INVENTOR
Gerhard A. Paulsen

United States Patent Office 2,910,796
Patented Nov. 3, 1959

2,910,796

ROLLER FOR DRAGGER NETS

Gerhard A. Paulsen, New Bedford, Mass.

Application March 13, 1957, Serial No. 645,759

7 Claims. (Cl. 43—9)

This invention relates to nets used on draggers and trawlers and is directed to an improved roller on the cable holding the bottom of the net adjacent the ocean floor and to an improved device for attaching the net to the cable.

On the draggers now operating out of New Bedford the net is held adjacent the ocean floor by a steel cable, on which are a number of large wooden rollers that roll on the ocean floor. Between each of the large rollers are two rollers of substantially less diameter that serve to space the large rollers. The net is held to the cable by chains attached to the net and having either rings through which the cable is passed or clamps attached to the cable. This structure has several disadvantages. First, when the cable is broken by striking an obstruction on the ocean floor, all of the rollers are lost. Second, the wooden rollers are badly chafed when forced into contact with the metal rings or clamps on the chains. Third, as the spacer rollers are made of wood, they frequently split and depart from the cable, which necessitates removing a number of rollers and restringing with new spacer rollers.

In British Patent No. 22,593 of 1908 and in British Patent No. 13,659 of 1911 it was proposed to limit the travel of the rollers on the cable by attaching clamps to the cable. While in the structure of each of these patents a break in the cable will result in the loss of few, if any, of the rollers, there are serious disadvantages. First, as a practical matter it is extremely difficult to attach the clamps in a manner that prevents them from slipping on the cable and at the same time permits their easy removal for the replacement of a broken roller. Second, if no fishing line is used, when the cable breaks, the stress of the cable is immediately transferred by the clamps to the hanging line, and if the hanging line gives under this stress, the net will be seriously damaged. Third, when wooden rollers are used, the clamps chafe the ends of the rollers.

In British Patent No. 622,604 and in British Patent No. 642,852 it is proposed to attach the cable to the net by rings, which encircle the spacer rollers, and which are attached to the hanging line of the net by chains. This structure has the disadvantages that it does not save the large rollers in the event of a break in the cable, and that it does not eliminate the chafing between the large rollers and the spacer rollers.

In British Patent No. 726,628 it is proposed to attach the large rollers to the net by a chain at each end of the roller. The disadvantages of this structure are that it does not eliminate the chafing between the large roller and the spacer rollers, and that it does not save the spacer rollers in the event of a break in the cable.

It is an object of this invention to provide a roller and a roller attachment of such construction that in the event the cable breaks all of the rollers will remain attached to the net while the broken cable passes freely through the rollers.

A further object is to prolong the life of the rollers.

At present the large rollers are not retreaded, for by the time the tread is worn through, the hole through which the cable passes is so worn that the roller must be discarded. It is practical to retread my rollers.

A still further object is to eliminate the loss occasioned by the splitting of the spacer rollers.

These objects are accomplished by providing each large roller with an integral extension on each side, each extension having the length and the diameter of a spacer roller, by providing each extension with a metal collar, by placing on each collar a metal ring, within which the collar is freely rotatable, but which has only limited axial movement on the collar, and by connecting the ring to the net by a chain.

Figure 1:
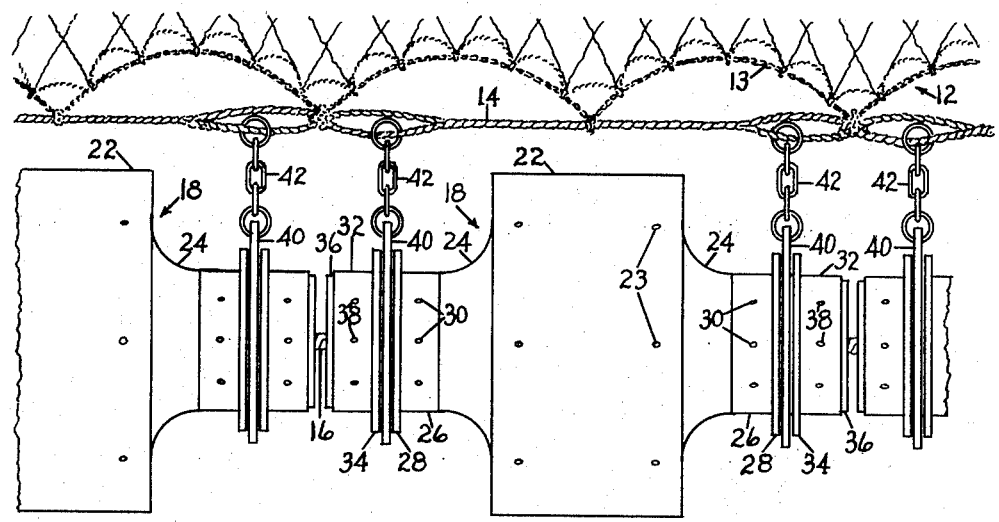
Fig. 1 is an elevation showing my improved rollers attached to a net.
Figure 2:
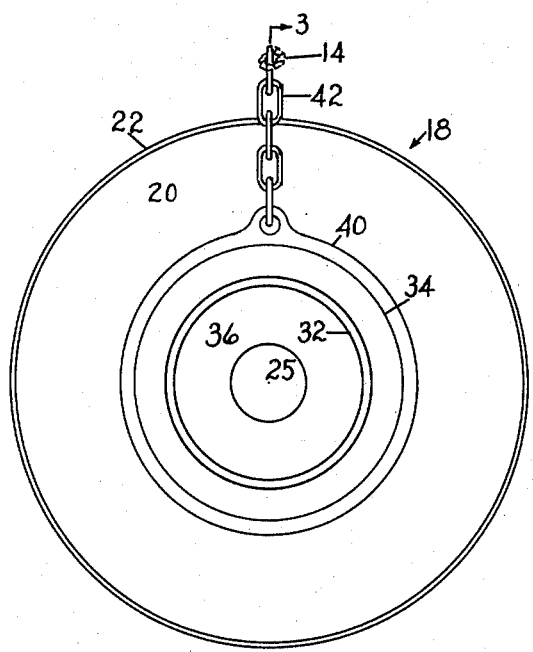
Fig. 2 is an end elevation on a larger scale of one of my rollers with the cable removed.
Figures 3, 4:
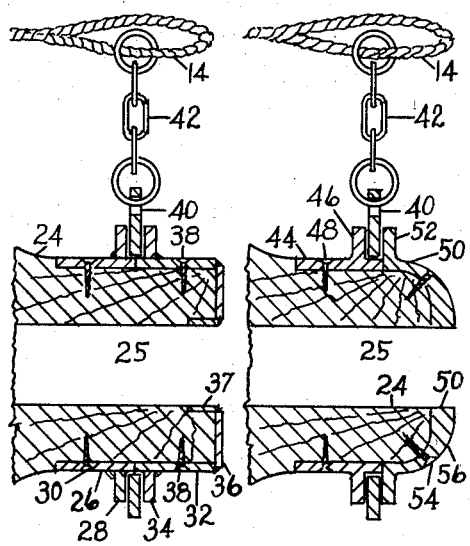
Fig. 3 is a section taken on the line 3—3 of Fig. 2.
Fig. 4 is a section similar to Fig. 3, but showing a modified roller.

Referring to Figs. 1, 2 and 3 of the drawings, 12 represents a net such as is generally used by draggers. At the bottom of the net is a hanging line 13, which is bent at intervals to a fishing line 14, which when fishing for cod and haddock is normally made of three-eighth (⅜) inch steel wire cable. I have shown my fishing line as made up of sections, one for each roller, to permit easy removal from the net of a broken or worn roller, but it is obvious to one skilled in the art that a continuous fishing line might be used.

A cable 16, which when fishing for cod and haddock is normally made of seven-eighth (⅞) inch steel wire cable, holds the bottom of the net adjacent the ocean floor. Freely rotatable on this cable are a number of my improved wooden rollers 18. While any hard wood may be used in making these rollers, I have used oak, since it is available in the vicinity of New Bedford. Each of these rollers is made up of a tread portion 20 and an integral extension 24 on each side of the tread portion. The roller has a bore 25, through which the cable passes. The tread portion 20 is covered by the conventional thin steel plate 22, which is held to the tread portion by screws 23. Each of the integral extensions 24 takes the place of a spacer roller.

On each extension 24 is a metal collar. While this collar could be made in a single piece, for ease in assembly I have shown it in the drawings as made up of two sections 26, 32 of six (6) inch steel pipe. The section 26 has a flange 28 welded to it and is attached to the extension 24 by screws 30. The section 32, which is attached to extension 24 by screws 38, has a flange 34 welded to it and has an annular plate 36 welded to its end to protect the end of the roller. I may weld to the opening of the annular plate 36 a short length of two and three-quarters (2¾) inch pipe 37 to project into the bore 25 and resist any tendency of the cable to split the roller.

A ring 40, having an internal diameter greater than the external diameter of the collar 26, 32 surrounds each extension 24. Flange 28 restricts the movement of the ring toward the tread portion of the roller, and flange 34 restricts the movement of the ring away from the tread portion of the roller. A chain 42 connects the ring 40 of the fishing line 14. Thus the ring 40 and the chain 42 hold the net 12 to the cable 16. In my drawings I have shown the top and bottom links of chains 42 as circular and slightly heavier than the other links. I prefer this construction because it reduces the possibility that these links may jam and deform. However, I do not wish to be limited to this construction, since chains made entirely of ordinary links will be operative.

Figs. 1, 2 and 3 illustrate a specific embodiment of my invention applied to a net used in fishing for ground fish such as haddock, cod and sole. The drawings are to scale, Fig. 1 being on the scale of two (2) inches to the foot in the original drawings and the other figures being on the scale of three (3) inches to the foot in the original drawings. Thus it will be seen that my improved roller including annular plates 36 has an overall length of twenty-four and one-half (24½) inches, a tread width of nine (9) inches and a tread diameter including plate 22 of sixteen and one-half (16½) inches. The flanges 28 and 34 are spaced one-half (½) inch apart and the diameter of the collar between the flanges is six and one-half (6½) inches. The ring 40 has a thickness of three-eighth (⅜) of an inch and an internal diameter of six and three-quarters (6¾) inches.

Obviously I do not limit myself to these particular dimensions, for they can be varied somewhat in fishing for the above mentioned ground fish, and, as is known to those skilled in the art, they will be varied substantially in the gear used for other fish.

Fig. 4 shows a modification of my roller in which the collar is made of cast iron. The section 44, which closely resembles the section 26, has a flange 46 and is secured to the extension 24 by screws 48. The section 50 has a flange 52 and is secured to the extension 24 by screw 54. The outer end of section 50 has a hemispherical surface 56. A ring 40, which is attached to a fishing line 14 by a chain 42, is located between the flanges 46 and 52. As is well known in this art, the curve of the cable makes the rollers in the center rotate faster than those at the ends. This difference in speeds of rotation produces friction that tends to prevent free rotation of the rollers. My hemispherical surface 56 tends to reduce this friction in two ways. First, it tends to bring the point of contact between two adjoining rollers nearer to the cable and, hence, reduces the leverage through which the friction operates. Second, as it makes for a line contact between the rollers, it reduces the amount of friction producing area. The section 50 may, if desired, be provided with a projection similar to the projection 37 in Fig. 3, but I do not regard this as necessary, for, as is shown in Fig. 4, I have thickened the end of the casting forming section 50 to give it additional strength in the locality where it is subjected to the greatest pressure and wear.

From my observations I would say that about half of the draggers operating out of New Bedford use no fishing line. It is well known that the use of a fishing line makes the net stronger, but the inclusion of a fishing line increases the cost of the net and increases the weight that must be handled in using the net. It is obvious that my invention may be applied to a net without a fishing line by attaching the chains 42 directly to the hanging line of the net. Consequently, when I claim chains attached to the hanging line of the net, I intend to cover both chains directly attached to the hanging line and chains attached to the hanging line through a fishing line.

In the claims the term, "bent," has been used in its broad sense; that is, "bent" has been used to mean "fastened." Consequently, the fishing line may be bent to the hanging line by winding either line about the other (in the drawing the hanging line 13 is shown wound about fishing line 14) or by the use of any auxiliary device that will fasten the two securely together.

I claim:

1. In a fishing device comprising a net having a hanging line on its lower edge, a cable for holding the lower edge of the net adjacent the ocean floor and wooden rollers on said cable, the combination therewith of an integral, axial extension on at least one side on at least one of said rollers, said extension being of substantially less diameter than the roller, a chain attached to the hanging line of said net, a ring attached to said chain and encircling said extension, and a metal collar on said extension, said collar having a surface of less diameter than the internal diameter of the ring to receive the ring, and said collar having projections on each side of said surface to limit the travel of the ring in the direction of the axis of the roller.

2. In the device called for by claim 1 a further projection on said collar covering the end of said extension and projecting into the bore of the roller, through which bore the cable passes.

3. In the device called for by claim 1 a further projection on said collar covering the end of said extension, the outer surface of said further projection being hemispherical.

4. In a fishing device comprising a net having a hanging line on its lower edge, a cable for holding the lower edge of the net adjacent the ocean floor and wooden rollers on said cable, the combination therewith of an integral, axial extension on at least one side of at least one of said rollers, said extension having a length closely approaching the width of the tread surface of the roller and being of substantially less diameter than the roller, a flexible connection attached to the hanging line of said net, a ring attached to said flexible connection and encircling said extension and a metal collar on said extension, said collar having a surface of less diameter than the internal diameter of the ring to receive the ring, and said collar having projections on each side of said surface to limit the travel of the ring in the direction of the axis of the roller.

5. In a fishing device for use by draggers a net having a hanging line on its lower edge, a cable for holding the lower edge of the net adjacent the ocean floor, wooden rollers on said cable, each of said rollers having a tread portion and an integral, axial extension on each side of said tread portion, each of said extensions being of substantial length and of substantially less diameter than the tread portion, chains attached to the hanging line of the net, a ring attached to each of said chains and encircling one of said extensions and a metal collar on each of said extensions, each of said collars having a surface of less diameter than the internal diameter of the ring encircling its extension, and each of said collars having projections on each side of said surface to limit the travel of the ring in the direction of the axis of the roller.

6. In the device called for by claim 4 a fishing line made up of a plurality of sections, each section passing through the top links of two chains connected to the extensions of the same roller, and each section being bent to the hanging line at intervals.

7. In a fishing device for use by draggers a net having a hanging line on its lower edge, a fishing line bent at intervals to said hanging line, said fishing line being made up of a plurality of sections, each of said sections having a loop at each end, a cable for holding the lower edge of the net adjacent the ocean floor, rollers on said cable, means connecting one end of each roller to a loop at one end of a fishing line section and means connecting the other end of each roller to the other loop of the same fishing line section to which said one end is attached, whereby after the rollers have been unstrung from the cable, any one roller may be removed from the net without disturbing the connection of the other rollers with the net.

References Cited in the file of this patent

FOREIGN PATENTS

| | | |
|---|---|---|
| 20,994 | Great Britain | 1913 |
| 22,923 | Great Britain | 1906 |
| 1,104,325 | France | Nov. 18, 1955 |